United States Patent

[11] 3,615,222

[72] Inventor Louis W. Mead
 Lexington, Mass.
[21] Appl. No. 757,340
[22] Filed Sept. 4, 1968
[45] Patented Oct. 26, 1971
[73] Assignee New England Nuclear Corporation

[54] METHOD AND APPARATUS FOR MEASURING THE AMOUNT OF A COMPONENT IN A BIOLOGICAL FLUID
28 Claims, 9 Drawing Figs.

[52] U.S. Cl. ............................................... 23/230,
 23/253, 23/259, 210/282, 250/83
[51] Int. Cl. ............................................... G01n 23/00,
 G01n 33/16
[50] Field of Search ........................................... 23/230,
 259, 292, 253, 230 B; 210/282; 250/83 CD

[56] References Cited
UNITED STATES PATENTS
3,072,362 1/1963 Allen ............................. 23/253 UX
3,397,965 8/1968 Berueffy ........................ 23/230

OTHER REFERENCES
Braverman, L. E., Jama 199, 07, 129– 132, Feb. 13, 1967

Primary Examiner—Morris O. Wolk
Assistant Examiner—R. M. Reese
Attorneys—Sewall P. Bronstein and Donald Brown ABSTRACT: A technique for clinically measuring the amount of a component, such as thyroxine, in a biological fluid, such as serum, of the type in which the amount of such component bound to a binding agent therefor, such as a protein, is measured by measuring the capacity of the binding agent to bind a tracer labeled compound and in which such capacity is measured by the use of a solid particulate adsorbent or absorbent for selectively adsorbing or absorbing the unbound tracer labeled compound from a liquid containing the same together with the bound tracer labeled compound and the bound component, the improvement comprising mixing the solid adsorbent and liquid in a container in which the solid particulate adsorbent is secured to the upper end thereof and the liquid is contained in the lower end, the mixing being carried out by inversion of the container. By this procedure, it is possible to simultaneously mix the solids and liquids of a plurality of specimens and controls and to thereby simultaneously incubate and centrifuge them to insure that all specimens and controls are subjected to identical conditions to thereby minimize errors and the time required to carry out such measurements.

The compounds used for carrying out the tests may be conveniently stored and shipped in the same container in which mixing, incubation, centrifuging and tracer measurement are carried out and which is in the form of a transparent or translucent, relatively rigid, tubular vial of a molded resin made up of two parts, in one of which is secured the adsorbent and in the other of which is located the liquid. During shipment and storage one part functions as a cap for the other, which is also capped and when the test is to be carried out, the parts are disassembled and reassembled with the open mouths of the two parts mated together to form a single chamber and with the solids-containing part located above the liquid-containing part so that the solids secured in the upper part do not come in contact with the liquid in the lower part until the container is inverted.

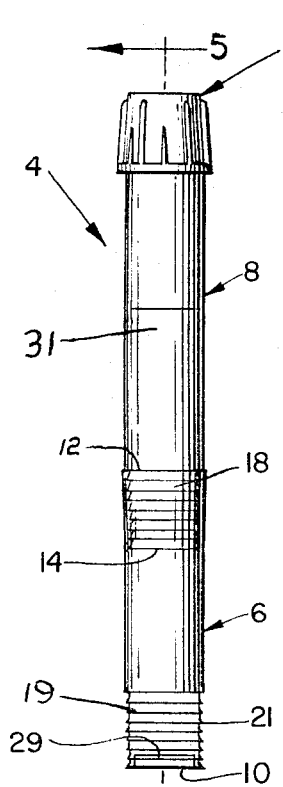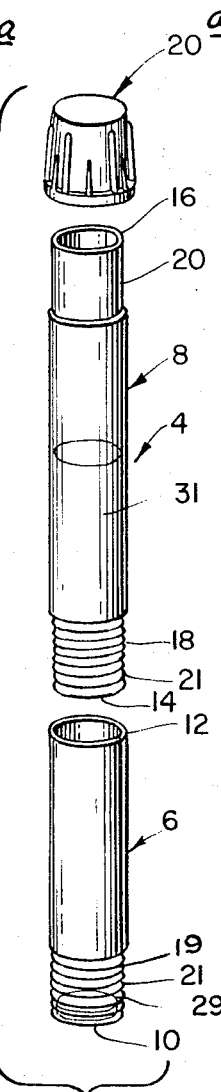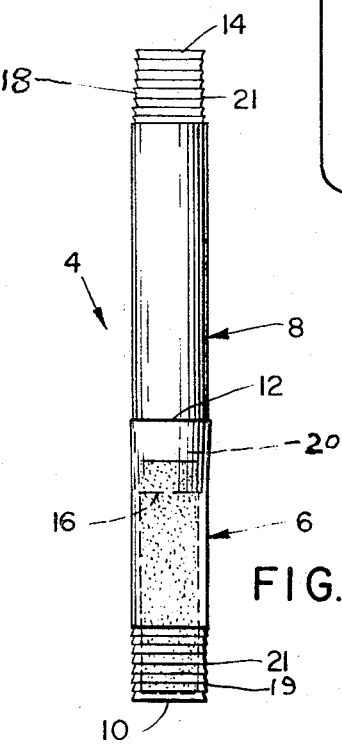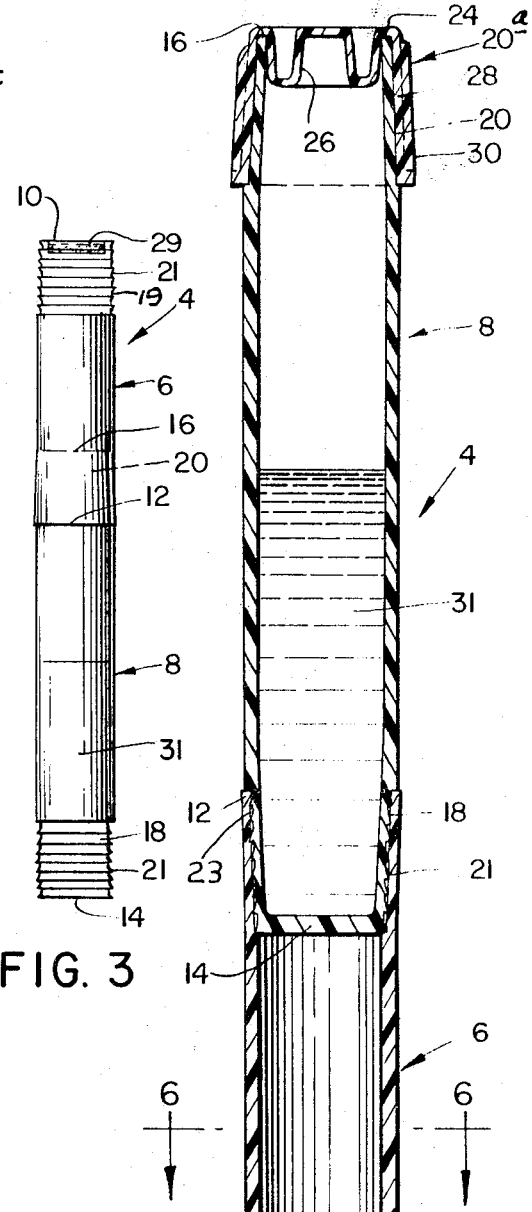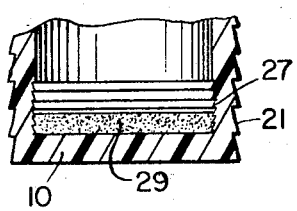
PATENTED OCT 26 1971
3,615,222
SHEET 1 OF 2
FIG. 1
FIG. 2
FIG. 3
FIG. 4
FIG. 5
FIG. 5a
INVENTOR
LOUIS W. MEAD
BY
Dike, Thompson, & Bronstein
ATTORNEYS INVENTOR
LOUIS W. MEAD
BY
Dike, Thompson & Bronstein
ATTORNEYS

METHOD AND APPARATUS FOR MEASURING THE AMOUNT OF A COMPONENT IN A BIOLOGICAL FLUID

BRIEF SUMMARY OF THE INVENTION

The present invention relates to improvements in carrying out methods for measuring the amount of a component, such as thyroxine, insulin, iron, Intrinsic Factor, Vitamin B-12, etc., in a biological fluid, such as serum, plasma, blood, gastric juice, etc., and improved apparatus for carrying out such methods. More particularly it relates to improvements in carrying out such methods of the type in which a measured amount of a compound, labeled with a tracer material, such as a radioactive nuclide or a luminescent, e.g. fluorescent, material and in buffered aqueous solution, is admixed with the component in or from a measured specimen of the biological fluid in the presence of a macromolecular compound, such as a protein, e.g. globulin, which may be present in the biological fluid as another component thereof or which may be added and which has the property of binding to itself the component to be measured and the tracer compound. The amount of the binding compound is insufficient to bind all the component and tracer labeled compound so that some of the component and tracer compound is bound to the binding compound and some of the tracer compound is in a free unbound state. The resulting liquid mixture is then mixed with a particulate solid adsorbent or absorbent, such as charcoal, for selectively adsorbing or absorbing the free unbound tracer compound leaving the bound tracer compound in the liquid phase to thereby separate the bound and unbound tracer compound. The liquid mixture and solid adsorbent are left in contact with each other during a predetermined incubation period to permit the adsorption or absorption to take place. The solid adsorbent, containing the unbound tracer compound, and the liquid containing the bound component and bound tracer compound, are then separated, e.g. by centrifuging, and the radioactivity or luminescence of either the separated solid adsorbent or the supernatant liquid is measured (this is a measure of the amount of tracer which has become bound to the binding agent, which is related to the amount of component bound to such binding agent, which, in turn, is a measure of the amount of component in the biological fluid being tested) and compared with a like measurement of a control norm to determine the amount of such component in the biological fluid being tested.

The binding agent is incompletely saturated with the component to be measured, i.e. its total binding capacity is greater than the amount of component bound thereto, so that part of its binding capacity is available to bind some, but not all, of the measured amount of tracer compound.

In most cases, the tracer labeled compound corresponds in chemical nature and formulation to the component to be measured or is closely related in chemical formulation thereto or an analogue thereof and is in a buffered aqueous solution of a pH corresponding to that of the biological fluid, e.g. pH of 7.4.

In most cases, the solid particles are coated with a macromolecule blocking agent, such as a protein, to aid in preventing the tracer compound bound to the macromolecular binding agent from being adsorbed.

Typical known techniques of this type are set forth below in table I, together with the ingredients in the liquid mixture and in the solid adsorbent and the literature references where applicable.

TABLE I

| Common name of test | Reference | Liquid | Solid |
|---|---|---|---|
| Charcoal T-3 ratio (unsaturated thyroxine-binding-globulin) test. | L. E. Braverman et al., JAMA, Feb. 13, 1967, vol. 199, No. 7, pp. 469-472. | 2 ml. $H_2O$ containing $I^{125}$ triiodothyronine, pH 7.4, barbital buffer, preservative-bovine se um albumin and patient's serum (½ ml.). | 6.06 mg. particulate charcoal (400-1,000 mesh), coated with .54 mg. hemoglobin, and 58.4 mg. lactose. |
| Unsaturated iron-binding capacity of plasma. | V. Herbert et al., J. Lab. Clin. Med., May 1966, vol. 67, No. 5, pp. 855-862. | 1 ml. pH 7.4 tris(hydroxy methyl) aminomethane chloride buffer, 0.5 ml. patient's plasma, 0.5 ml. ferrous ammonium sulfate labeled with $Fe^{59}$ $Cl_3$ (containing 3 micrograms Fe). | 50 mg. particulate charcoal coated with 5 mg. hemoglobin, lactose. |
| Intrinsic factor | C. Gottlieb, et al., Blood, 25, 875 (1965). | 2 ml. 0.85% NaCl, 0.1 ml. gastric juice, 0.1 ml. serum containing antibody to IF, 7.5 mg. $Co^{60}$ vitamin B-12. | 50 mg. particulate charcoal coated with 10 mg. of bovine serum albumin, fibrinogen or dextran. |
| Serum vitamin B-12 | K. S. Lan et al., Blood, 26, 202 (1965). | 1.5 ml. 0.9% NaCl, 0.5 ml. patient's serum, 0.5 ml. 0.25 N HCl, 0.5 ml. solution of 500 picograms $Co^{57}$ vitamin B-12, 0.5 ml. solution of 5 micrograms intrinsic factor. | 50 mg. particulate charcoal coated with 10 mg. bovine serum albumin. |
| Insulin assay | V. Herbert et al., J. Clin. Endocrinol., 25, 1375 (1965). | 2.9 ml. of 350 mg. albumin/100 ml. $H_2O$, 0.5 ml. of 20 microunits $I^{131}$ insulin, 0.1 ml. of patient's serum, 0.5 ml. of a solution of serum containing anti-insulin antibody diluted 1:10⁵. | 50 mg. particulate charcoal coated with 5 mg. dextran 80. |
| Total thyroxine | General reference: B. E. P. Murphy et al., J. Clin. Endocrinol., 26, 24 (1966). | Same as T-3 but instead of patient's serum contains dried alcoholic extract (T-4) of 0.1 ml. patient's serum plus 0.5 ml. of a 1:20 dilution of standard serum. | Same as T-3. |
| T-3 by resin | General reference: M. L. Mitchell, J. Clin. Endocrinol. Metab., 68, 662-701 (1961). | Same as charcoal T-3-$H_2O$ with $I^{131}$ triiodothyronine, pH 7.4, tris buffer and 0.5 ml. patient's serum. | Amberlite CG 400 resin (polystyrene quarternary ammonium resin) in chloride cycle (Rohm & Haas), or Duolite A-40 (Chem. Process Co.) or Dowex 1 (Dow Chemical). |

In the Charcoal T-3 Ratio test, the component of the serum to be measured is thyroxine (T-4) which is a tetraiodo thyronine (a polyiodothyronine), the radioactive labeled compound is $I^{125}$ or $I^{131}$ triiodothyronine (radioactive labeled T-3), which is an analogue of thyroxine and which is a radioactive labelled polyiodothyronine at least one iodine atom of which is radioactive (in this case one such atom), and the binding agent is globulin in the patient's serum. In the case of the serum vitamin B-12 test, the component is vitamin B-12 whereas the radioactive labeled compound is $Co^{57}$ vitamin B-12 and the binding agent is Intrinsic Factor. In the case of the Intrinsic Factor test, the component is Intrinsic Factor, the radioactive labeled compound is $Co^{60}$ vitamin B-12, vitamin B-12 being closely related to Intrinsic Factor, and the binding agent is the antibody to Intrinsic Factor. In the unsaturated Iron-Binding Capacity of Plasma test, iron is the component, $Fe^{59}$ $Cl_3$ labeled ferrous ammonium sulfate is the radioactive compound and the binding agent is globulin in the patient's serum. In the Insulin Assay test, the component being measured is insulin, the radioactive compound is $I^{131}$ labeled insulin and the binding agent is the anti-insulin antibody.

A serious, unsolved problem in carrying out these types of tests efficiently is as follows:

In carrying out these tests clinically, it is necessary, as aforesaid, to run one or more controls of known normals for comparison purposes and to compensate for the effects of test variables such as deterioration of reagent, temperature and duration of incubation (i.e., duration of the total time during which the liquid mixture and solid adsorbent are left in contact with each other before centrifuging), slight differences in composition of reagents, duration of centrifuging and of the time between completion of incubation and commencement of centrifuging and variations in the sensitivity of the radioactive or other tracer measuring instrument. Further, in practice the tests are more conveniently and economically carried out with a plurality of patient specimens and a single control or set of controls.

It is extremely important for accurate results that all the specimens and controls be subjected to identical treatment. It is as particularly important that the total time of contact be identical for all.

In attempting to do this in the past, specimens and controls were handled sequentially, using very careful timing. Thus, a measured amount of a carefully prepared suspension of the particulate solid adsorbent in water is carefully pipetted into the liquid mixture of each specimen and control sequentially, followed by carefully timed sequential incubation and carefully timed sequential centrifuging. The incubation and centrifuging has to be sequential because the incubation and centrifuging of the first specimens and/or controls, after the solids suspension has been added to the liquid mixture thereof, can not be delayed until the solids suspension is pipetted into the following specimens and/or controls. Otherwise, the total time of contact between the liquid and solid phases (they are in contact during incubation and centrifuging and during the transition therebetween) would vary to thereby produce error. However, this sequential treatment does not guarantee identical conditions even if timing is rigorously controlled because the following will inevitably vary with time: temperature of incubation, speed of centrifuging, transition between incubation and centrifuging and the sensitivity of the measuring devices. Also, this technique is time consuming and is still subject to timing error.

The present invention minimizes these problems by making it possible to carry out most of the operations, e.g. mixing, incubation and centrifuging simultaneously, and other operations, such as tracer measurement, at much closer intervals.

This is achieved in accordance with the invention by mixing the liquid mixture and solids for each specimen and control in a container, preferably in the form of an elongated transparent or translucent tube or vial, in the upper portion of which a measured amount of the particulate solids is firmly secured and in the lower portion of which the liquid is located, simultaneous mixing being carried out by simultaneously inverting the containers to cause the liquid mixtures to simultaneously flow into contact with the secured solids to suspend the solids in the liquid. Because the particulate solid adsorbent is firmly secured to the upper end of each container, it is kept from coming into contact with the liquid at the lower end of the container until the containers are simultaneously inverted. Subsequent incubation and centrifuging of the specimens and controls may then be carried out simultaneously in the same containers while retaining all the containers in like positions at all times to thereby reduce to a minimum any error due to varying conditions for each specimen and control and to reduce to a minimum the total time required for the tests. Furthermore, tracer measurements of the samples and controls can be conveniently and accurately made with conventional tracer-measuring devices in the same containers, which are designed to reduce to a minimum inaccuracies in such measurements due to nonuniformities in the containers.

A further advantage of the invention is that the compounds required for the tests can be conveniently packaged, stored and shipped in the aforesaid containers in which the mixing, incubation, centrifuging and tracer measuring are carried out. This is achieved in accordance with the invention by use of containers, preferably in the form of relatively rigid, straight, transparent or translucent plastic tubular vials, each having at least two parts. Each of the parts has an opening, which is closed during shipment and storage and which is opened to carry out a test. The particulate solids are secured in one part. The other part contains the liquid absent the component to be measured. The exposed openings of the two parts are adapted to be removably mated together (after the component to be measured has been added to the liquid, e.g. in the form of a measured quantity of serum or plasma), with the part containing the solids located at the upper end. Since the solids are secured in the upper container part in which they are located, they do not flow downwardly into the liquid. However, when the assembled container is inverted, the liquid flows into the solids to suspend the solids therein. By assembling the parts of each of a plurality of containers, as aforesaid, after adding samples to be tested to some and a control to one or more others, and inverting them all simultaneously, the liquid and solids of each are mixed simultaneously.

Preferably, the open end of one of the parts (preferably that containing the solids) is adapted to be removably secured over the closed end of the other part so that during shipment and storage the other part functions as a closure or cap for the one part, with a closure or cap being provided for the open end of the other part. In this way, when a test is to be made it is necessary only to remove the closure from the other part and remove the one part from the closed end of the other part followed by mating the open ends of the two parts together with the solids-containing part above the liquid-containing part.

With such an arrangement, centrifuging may be carried out so as to force the solids to accumulate in the part of the container in which they were originally secured, whereupon such part may be removed and the tracer measurement carried out in the other part containing the liquid.

In a preferred embodiment, a portion of the inner surface of the tube part in which the solids are secured is roughened or corrugated slightly to aid in securing the solids in the tube.

In a preferred embodiment, the particulate solid adsorbent is in the form of a cake lightly cemented or bonded to the interior of the container by a water-soluble binder or cement, such as lactose, which also lightly bonds the solid particles of adsorbent together into the cake. When the mated containers are inverted to flow the liquid into contact with the solids, the water soluble cement is dissolved in the liquid and the solid particles of adsorbent become suspended in the liquid and adsorb the free unbound tracer compound, leaving the bound tracer compound in the liquid phase.

A plurality of the containers each containing separated liquid and solids in the parts thereof, as aforesaid, may be conveniently packaged and shipped together in a compact package together with one or more other containers of the same construction but empty except for a dry control, e.g. freeze dried, in one of the parts thereof.

BRIEF DESCRIPTION OF THE SEVERAL VIEWS OF THE DRAWINGS

Further advantages and objects of the invention will be apparent from the following description and drawings, in which:

FIG. 1 is a view in elevation of a preferred embodiment of the container package of the present invention made up of two parts and a closure cap assembled for storage and shipment to provide two separate closed compartments in one of which is secured the solids and in the other of which is contained the liquid;

FIG. 2 is an exploded view of the container package of FIG. 1 showing the two parts of the package and the closure therefor disassembled from each other;

FIG. 3 is a view like FIG. 1 but in which the solids-containing part of the package has been removed from its storage and shipping position with respect to the liquid-containing part and the two parts have been reassembled for carrying out a test to form a single compartment at the upper part of which is secured the solids and in the lower part of which is located the liquid;

FIG. 4 is a view like FIG. 3 but in which the reassembled container has been inverted to cause the liquid to flow into contact with the solids to disperse them in the liquid;

FIG. 5 is a section in elevation of the container of FIG. 1;

FIG. 5A is an enlargement of the lower end of the container of FIG. 5;

DETAILED DESCRIPTION

Figure 6:
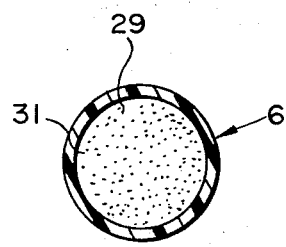
FIG. 6 is a section in plan taken along the line 6—6 of FIG. 5.

Referring to the drawings, 4 designates a container package embodying the invention. It comprises a relatively rigid, straight tubular vial of translucent or transparent, molded polypropylene made up of a shorter part 6 and a longer part 8.

The shorter vial 6 is closed at one end 10 by an end wall integral with the vial and open at its other end 12. It has a very slight internal and external inward taper from the open end to the closed end thereof and the open end portion thereof has a slightly enlarged internal diameter at 23 (FIG. 5). The longer vial 8 is also closed at one end 14 by an end wall integral with the vial and open at its other end 16. The open mouth 12 of the shorter vial 6 is adapted to be removably mated or telescoped over the reduced, slightly tapered, closed end portion 18 of the long vial 8 with a tight press fit, as shown in FIGS. 1, 5 and 6, which is the manner in which the two vials are assembled during shipment and storage, with the reduced, slightly tapered open end portion 20 of the longer vial 8 being closed and sealed by a removable, resilient polypropylene cap 20a telescoped thereover. In effect, the longer vial 8 forms a cap for the shorter vial 6.

The open mouth 12 of the shorter vial 6 is also adapted to be removably mated or telescoped over the reduced slightly tapered open end portion 20 of the longer vial 8 with a tight sealing press fit (FIGS. 3, 4 and 7) after disassembly of vial 6 from the closed end of vial 8 and of cap 20a from the open end of vial 8 (FIG. 2), which is the manner in which the two vials are reassembled in carrying out a test.

The closed end portions 19 and 18 of vials 6 and 8, respectively, are provided with parallel circumferential strengthening ribs or beads 21.

Cap 20a comprises an end wall 24, which is centrally dished at 26 to form an annular sealing ring 26 and which has a depending annular wall 28 having a slight internal and external taper and a plurality of longitudinal external strengthening ribs 30. The depending wall 28 fits tightly around the reduced, tapered open end portion 20 of the longer vial with the end of such end portion squeezed tightly between the resilient sealing ring 26 and the opposed resilient depending wall 28, as shown, to form a liquid tight seal.

Within the shorter vial 6 at the closed end 10 thereof is located a measured quantity of a finely divided particulate solid adsorbent or absorbent material 29 held lightly together in the form of a cake or pellet, which is lightly cemented to the bottom and adjacent internal side wall of the short vial 6. Such adjacent internal wall is provided with slight saw tooth-shaped protuberances or corrugations 27 to aid in securing the solids to the vial and thereby prevent them from being displaced during handling or by gravity when the vial 6 is inverted. The longer vial 8 contains a buffered aqueous saline solution 31 of a radioactive labeled compound.

The solids in vial 6 and the liquid in vial 8 are packaged, shipped and stored in the container, assembled as shown in FIGS. 1 and 5, with the long vial 8 forming a closure for tightly sealing the short vial 6, containing the solids, and the long vial 8, containing the liquid, being tightly sealed by the cap 20a.

A plurality of the containers 4 each containing separated liquid and solid components, as aforesaid, may be conveniently shipped as a package in a single capped container (not shown).

EXAMPLE

A charcoal T-3 Ratio Test (Unsaturated Thyroxine-Binding-Globulin Capacity Test) for measuring the amount of thyroxine in a number of patient's sera was carried out as follows: 12 containers each having the construction of FIG. 1, were prepared by adding to the bottom of each short vial 6 a powdered, free flowing mixture of 6.06 mg. solid particulate NORIT A charcoal (400–1,000 mesh), coated with 0.54 mg. hemoglobin, and 58.5 mg. free-flowing powdered lactose. This was followed by adding to the powdered mix in each vial 6, two drops of ethyl alcohol to dissolve the lactose sufficiently to cause it to become sticky and adhesive to thereby bind or cement the coated charcoal particles together and to the inner surface of vial 6. The alcohol is then permitted to dry (about 2 hours) to thereby form a dry cake of the hemoglobin coated charcoal particles cemented securely together and to the inside of the vial by the dried lactose. There was also added to each of the open long vials 8, 2 ml. of an aqueous buffered solution of 1–2 nanograms triiodothyronine labeled with 0.06 to 0.25 microcuries of $I^{125}$ buffered with 0.1 M barbital (diethylbarbituric acid) buffer to a pH of 7.4 and containing 0.05 M sodium chloride, a mixture of methyl p-amino benzoic acid (0.05 percent)* and propyl p-amino benzoic acid (0.05 percent)* as a preservative and 0.01 percent* bovine serum albumin to reduce adsorption of the radioactive labeled triiodothyronine on the walls of the vial.

Thereafter the long vials 8 were capped with caps 20a to seal them and the closed ends of the long vials 8 were mated with the open ends of their vials 6 to close and seal the latter vials, as shown in FIGS. 1 and 5.

*By weight.

The twelve vial assemblies were then packaged in a cylindrical, tightly capped container together with a thirteenth vial assembly, assembled in the same manner as the others but in which the shorter vial was empty and the longer vial contained a freeze-dried (from 2 ml. of serum) control serum, containing a known normal amount of thyroxine, instead of the aforesaid liquid. A different colored cap 20a was used for the control serum to clearly indicate that it was a control. The package of thirteen vial assemblies was stored for six months under refrigeration (5° C.) after which it was opened and the vial assemblies used as follows to successfully carry out a plurality of Charcoal T-3 Ratio Tests.

The control vial assembly was removed from the package of thirteen vial assemblies and disassembled by removing the cap 20a and short vial 6 from the long vial 8 and the long vial, containing the freeze-dried control serum, was placed in a well 40 (see FIG. 7) in a multiwell heating block 42 held at 37° C. 2 ml. of distilled water was added by dropper, the cap 20a was replaced and the vial was left in the temperature block for at least 5 minutes to reconstitute the control serum.

Figure 7:
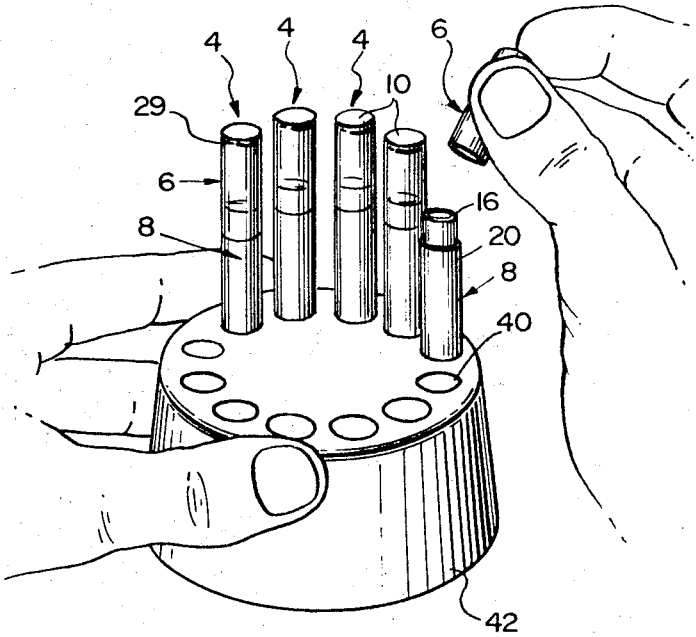
FIG. 7 is a view in perspective of the liquid-containing parts of a plurality of the container packages of FIG. 1 located in the wells of a multiwell temperature block after they have been disassembled for testing and showing the solids-containing part of one of the containers being reassembled over the mouth of its liquid-containing part during testing.

In this example, four patients were tested so that five of the vial assemblies, containing the aforesaid liquid and solid components, one for each patient and one for the control, were removed from the package and disassembled (FIG. 2) by removing the caps 20a and short vials 6 from the long vials 8, whereafter the long vials 8 were placed in wells in the heating block (see FIG. 7).

0.5 ml. of serum from 2 ml. of venous blood from each of the four patients was pipetted into each of four of the vials 8 containing the buffered radioactive labeled triiodothyronine solution and the same amount of the control serum was pipetted into the fifth of the long vials 8. Each of the patient's vials was clearly marked with the patient's name.

All the five vials were then reassembled by mating the open ends of the short tubes 6 to the open ends of the long tubes 8 in wells 40, as shown in FIGS. 3 and 7, to provide in each of the vial reassemblies a single internal elongated chamber or compartment with the charcoal cake located at the upper end thereof and the liquid at the lower end. Because the charcoal cake was securely bonded to each vial 6, it did not fall into the liquid below. The vials were kept in the wells at 37° C. for five minutes to come to a constant temperature.

Figure 8:
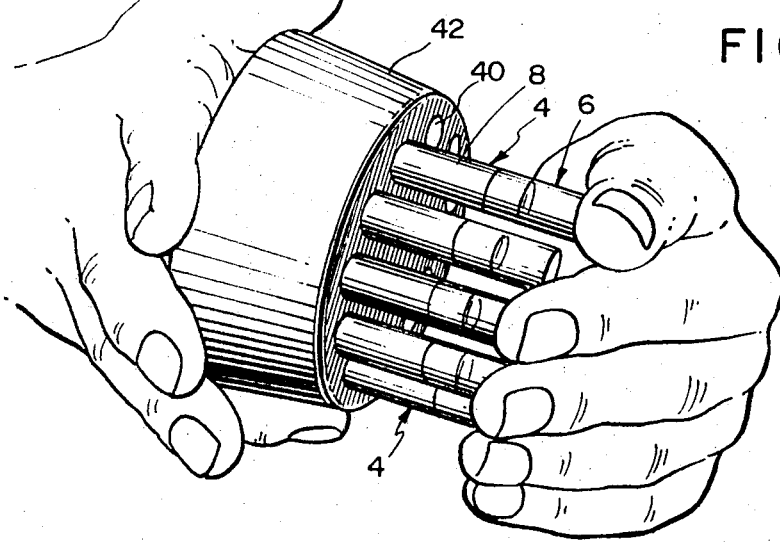
FIG. 8 is a view like FIG. 7 showing a plurality of the containers, including a control and a plurality of specimens being simultaneously inverted, after all the solids-containing parts have been reassembled over the mouths of the liquid-containing parts of FIG. 7.

Thereafter all of the vial reassemblies, while in the wells of the temperature block 42, were inverted simultaneously six times (FIG. 8) to cause the liquid in each vial reassembly to flow into contact with the solids and to disperse the solid-coated charcoal particles intimately throughout the liquid. Since the lactose binding these particles to each other and to the vial is water soluble it was dissolved by the water in the liquid mixture to thereby set free the solid particles.

Inverting all the tubes simultaneously in this way assures identical reaction time for all the specimens and the control.

After the last inversion, all the vial reassemblies were reversed in the wells with their short vials down. This can be done simultaneously by placing a second temperature block over the reassemblies in the first temperature block and then reversing the whole so that the vial reassemblies end up in the wells of the second temperature block with the short vials down.

All the vial reassemblies were left in this condition for a carefully timed incubation period of 10 minutes at 37° C.

At the end of the incubation period, the vial reassemblies were removed from the temperature block and placed in a centrifuge keeping the short vial side down at all times while transferring them to the centrifuge and in the centrifuge.

All the vial reassemblies were then centrifuged simultaneously for 10 minutes until the supernatants were clear of all the solids, which were compacted at the corrugated ends of the short vials. Immediately following centrifugation, the reassemblies were removed one at a time, carefully inverting each reassembly so that the longer vial is downward, and the shorter vials containing the solids were immediately removed and discarded, the caps 20a being replaced on the now-open mouths of the longer vials or tubes 8.

It is desirable to have the short tubes down during incubation to insure that any settling of solids will be at the bottom of the short tube having the internal corrugations, where the solids are forced during centrifuging.

The radioactivity of the liquids in the long vials 8 was then measured by placing the vials in the well of a conventional well counter and the count of each specimen was compared to that of the control to obtain a ratio, taking into account the background by obtaining a background count and subtracting it from each of the specimen and control counts used in obtaining the ratio.

The results achieved were excellent and were much more accurate than those obtained with the conventional Charcoal (protein-coated charcoal) T-3 Ratio Test, in which the samples and controls are tested sequentially, with the TBI (Thyro-Binding Index) technique, with the Red Blood Cell (RBC) Uptake technique and with the Resin Sponge Uptake Technique, all of which are conventionally used for testing thyroxine (T-4).

When the serum is admixed with the radioactive labeled T-3 ($I^{125}$-triiodothyronine) solution in the longer vial, the radioactive T-3 becomes bound to the unsaturated available sites (i.e. the sites which are unoccupied by thyroxine in the serum) of the thyroxine binding globulin (TBG). However, there is insufficient TBG to bind all the radioactive labeled T-3 so that some exists in the liquid in the free unbound state. This free unbound radioactive labeled T-3 is selectively adsorbed or absorbed by the hemoglobin-coated charcoal, leaving the TBG-bound radioactive labeled T-3 in the liquid phase. The TBG-bound radioactive labeled T-3 is not adsorbed or absorbed by the hemoglobin-coated charcoal because the TBG to which it is bound is macromolecular and the macromolecules are too large to be adsorbed by the charcoal. Also, the hemoglobin coating over the charcoal particles functions as a macromolecular blocking agent. Accordingly, measurement of the radioactivity of the liquid is a measure of the bound radioactive labeled T-3, which is a measure of the sites (unsaturated by thyroxine) available on the TBG for binding the radioactive labeled T-3, which is a measure of the amount of thyroxine in the serum, as well as the amount of TBG. Accordingly, by comparing the radioactivity (count) of the specimen and control the amount of thyroxine below, at or above normal in the specimen can be established.

This in-vitro test is easily performed, does not subject the patient to radiation, is not affected by exogenous iodides, provides results quickly and accurately and requires a minimum of equipment.

It is extremely important that the measured amounts of solids in the shorter vial 6 be accurate and uniform. It is also important that the amount of liquid in the longer vial 8 and the amount of serum added thereto be accurate and uniform to achieve accurate and dependable results.

The lactose not only functions as a cement or binder for the charcoal particles but also adds volume and bulk to the charcoal to permit accurate and uniform measurement thereof. Without the lactose, the required amount of charcoal is so small that it is difficult to handle and to measure out the required dosages accurately and uniformly. Any compatible solid free-flowing binder or cement can be used in place of the lactose to cement the charcoal particles to each other and to the vial 6 and to increase the solid bulk and volume, so long as it is highly water soluble so that it will readily dissolve in the liquid when the vial reassemblies 6 and 8 are inverted and thereby set the charcoal particles loose for suspension in the liquid and so long as it is inert with respect to the coated charcoal and components of the liquid phase and is soluble in or activated by a highly volatile solvent, such as ethyl or methyl alcohol, so that it can be rendered sticky and adhesive by adding thereto just a few drops of the solvent, which may be volatilized to form the dry cake cemented to the vial 6 in a relatively short time. A number of water soluble organic adhesive resins also soluble or activatable in the lower alcohols and/or other highly volatile solvents, such as gelatin, dextran, polyvinyl alcohol, casein, dextrin, starch, etc., can be used in place of all or part of the lactose. If one is willing to sacrifice rapidity of drying time and hence of production, it is not necessary that the binder be readily soluble or activatable in a highly volatile solvent. In such case, the binder can be activated to render it adhesive and sticky by adding a few drops of water.

The amount of lactose should be sufficient to adequately cement the charcoal particles to each other and to the vial and to supply sufficient volume to permit the solids dosage to be accurately and uniformly measured but should not be so great as to make the liquid phase too dense for good separation of the coated charcoal particles during centrifuging by virtue of the lactose dissolved in the liquid phase when the liquid and solids are mixed. A lactose/charcoal ratio of between about 20/1 and 7/1 or 8/1 is preferred.

The coated charcoal may have added to it an agent, such as pyrogenic silica e.g. 1 percent), to aid in making it and the powdered lactose free flowing.

Also, other known water-insoluble, particulate solid adsorbents, such as ion exchange resins, e.g. Amberlite CG 400 (polystyrene quarternary ammonium resin in the chloride cycle) sold by Rohm & Haas under that name, Duolite A-40 sold by Chem. Process Company under that name, Dowex 1 sold by Dow Chemical Company under that name and IRA 400 in the formate or chloride cycle and in the form of resin beads or in polyurethane in the form of a resin sponge (see J. Clin. Endocrinol and Meta 18: 1437–1440, 1958 and 21: 456–464, 1961; J of Nuclear Medicine 5: 489–499, 1964 and 3: 41–46, 1962), can be used in place of or admixed with the coated charcoal particles, depending on the particular test to be carried out and biological fluid component to be tested for.

Certain T-3 tests for thyroxine (T-4) using the aforesaid IRA in polyurethane in the form of a resin sponge are called Resin Sponge Tests. In these tests, the radioactive uptake of the separated solids is measured (to measure the amount of T-4 and/or T-3 in the serum) by measuring the radioactivity thereof.

The dosage of coated charcoal or other solids can be secured or affixed in and to the vial by means other than a cement or binder. For example, a lightly pressed tablet of the charcoal particles (with or without a neutral free-flowing solid to add bulk and volume) can be forced into the bottom of the vial or be held in place with a piece of meshwork secured to the vial or with a disc of a material soluble in the liquid in the longer tube to secure the dosage of charcoal particles in the vial 6. Also, the charcoal can be located in a gelatin capsule adhered to the vial 6.

The coating over the charcoal particles may be any macromolecular blocking agent, preferably a protein, such as bovine serum albumin, fibrinogen, dextran or a mixture thereof or of one or more of them with hemoglobin. If desired, the coating can be omitted altogether.

It is pointed out that the basic T-3 unsaturated thyroxine-binding-globulin capacity test, using a buffered aqueous solution of radioactive labeled T-3 and protein-coated charcoal, is well known. The amounts and kinds of protein coated charcoal and other solid particulate adsorbents, the pH of the liquid phase (usually between 7 and 7.4), the amounts and kinds of radioactive labeled T-3, buffer (common buffers are diethylbarbituric acid, usually referred to as barbital, tris (hydroxy methyl) aminomethane, usually referred to as Tris, and a mixture of mono and disodium phosphates), preservative, sodium chloride and other ingredients of the liquid mix, the amounts of serum, and the times and conditions of incubation and centrifuging, which can be used in the present invention, are the same as those used in the aforesaid known tests. Accordingly, the present invention is not based on these and it is unnecessary to discuss them in detail.

Although the present invention, involving the simultaneous mixing of the solid adsorbent phases and the liquid phases of one or more specimens and one or more controls by virtue of the two-part vials with the solids secured to and in one part of the vial, followed by simultaneous incubation and centrifuging thereof, is described in the aforesaid example applied to the T-3 "unsaturated thyroxine-binding-globulin capacity test," it may be used with equal advantage in any of the tests referred to in table I or any other clinical tests to determine the amount of a component in a biological fluid, in which mixture of a liquid phase and a solid phase is required. The kind and amount of radioactive label and radioactive labeled compound, of solid adsorbents and coatings for such adsorbents, of buffer compound and of preservative, as well as the pH of the liquid phase, the times and conditions of incubation and centrifuging and the biological fluid used, will vary widely depending on the particular test to be carried out and the particular biological fluid component to be tested, all of these being known. In some of these tests incubation is carried out at room temperature.

The radioactive-labeled compounds used in most of these tests have generally the same chemical formulation as the component to be tested for or one closely related thereto. Thus, in testing for tetraiodothyronine, radioactive ($I^{125}$ or $I^{131}$) labeled triiodothyronine is used, in testing for insulin, radioactive ($I^{131}$) labeled insulin is used, in testing for vitamin B-12, radioactive ($Co^{57}$) labeled vitamin B-12 is used and in testing for iron $Fe^{59}$ $Cl_3$ is used. However, in testing for Intrinsic Factor, the radioactive labeled compound used is $Co^{60}$ labeled vitamin B-12 which is closely related to Intrinsic Factor.

The aqueous buffered solution of radioactive labeled compound in most of these tests is a saline solution.

Although in the example, the radioactivity (uptake) of the centrifuged liquid supernatant was measured, the uptake of the centrifuged coated charcoal can be measured.

The vials of the invention can be of any transparent or translucent plastic resin such as polyethylene or polyvinyl chloride, molded, preferably injection molded, into the vial shapes. It may also be made of glass. Preferably, the vials are relatively rigid and are relatively straight so that the solids and liquid can be efficiently centrifuged.

The bovine serum albumin in the liquid phase may be omitted, particularly with the use of plastic vials. Also, it may be replaced in part or in whole by other proteins of substantially smaller molecular size than the globulin to reduce the adsorption of the radioactive labeled T-3 or T-4 on the vial.

The wall thickness at least of the longer vials should be kept uniform to avoid errors in counting due to nonuniform wall thickness.

The fit between the cap 20a and longer vial 8 and between the mated open mouths of the two vial parts should be air and liquid tight to avoid leakage.

The biological fluid which can be tested in accordance with the present invention includes blood, urine, plasma, gastric juice, serum, spinal fluid, etc.

Preferably, the package in which the plurality of vial assemblies is packaged is in the form of a capped cylinder, in which the vialed assemblies are packed in vertical positions with the shorter vials, containing the solids secured therein, being located at the bottom and the larger vials, containing the buffered saline solution of radioactive-labeled compound, at the top. It is preferred to provide a seal between the cylinder package and its cap in order to reduce loss by water vapor transmission through the plastic vial walls to a minimum. In this respect, vapor transmission through the vial walls into the cylinder package causes the water vapor pressure in the cylinder package to quickly build up until an equilibrium is established inside and outside the vials whereupon such transmission ceases.

Although in the example the plurality of vial reassemblies are simultaneously inverted in the multiwell temperature block this may be done without the block so long as the inversion of all the reassemblies is simultaneous. From the time of the first inversion until centrifuging is completed and the small vials 6 with the centrifuged solids are removed from the larger vials, the vial assemblies should all be kept in substantially the same positions of inversion or noninversion.

In the case of the Insulin Assay Test, in order to test one patient's specimen, it is necessary to mix liquid and solid phases in four different vial assemblies. This can be done in accordance with the present invention simultaneously to thereby achieve more accurate results in a much shorter time.

Although it is believed that the charcoal selectively adsorbs the free unbound radioactive labeled compound on its surfaces, the phenomenon may involve absorption into the charcoal particle or both adsorption and absorption. For convenience, this phenomenon, whether it be adsorption or absorption, or both, will be referred to as adsorption and the solids as adsorbents.

It is not intended that the invention be limited to the embodiments described in the aforesaid description and shown in the accompanying drawings but only to the methods and products claimed in the following claims and their equivalents.

I claim:

1. In a method of measuring the amount of a component in a biological fluid in which a liquid mixture, containing
   1. said component in or from a measured sample of said fluid,
   2. a measured amount of a tracer-labeled compound and
   3. a compound, which has the property of binding said component and said tracer-labeled compound thereto and which binding compound is present in an amount insufficient to bind all said component and tracer compound so that some of said tracer compound is in a free state and some is bound to said binding compound, is mixed with a solid particulate adsorbent for selectively adsorbing the free unbound tracer-labeled compound to thereby separate the bound from the unbound, and in which said liquid mixture and adsorbent are left in contact with each other during a predetermined incubation period to permit said adsorption to occur and are then separated, the solid adsorbent containing unbound tracer compound being thus separated from the liquid containing the bound component and bound tracer compound, and in which the tracer intensity of at least one of said separated adsorbent and liquid is measured, the improvement comprising contacting with each other said liquid mixture and adsorbent in a container, in the upper portion of which container said adsorbent is secured and in the lower portion of which container said liquid mixture is located, said contacting being carried out by inverting the container to cause said liquid mixture to flow into contact with said adsorbent.

2. A method according to claim 1, said adsorbent being charcoal.

3. A method according to claim 1, said container being in at least two parts each of which has a closed and an open end and in one of which a liquid containing said tracer-labeled compound is contained and in the other of which said solid adsorbent is secured, adding said component to said liquid, the open end of a first of said two parts being removed from the closed end of the second part and then being removably secured over the open end of said second part with the solid adsorbent located above the liquid mixture, whereby communication is provided between the interior of the parts so that upon said inversion of the container, said liquid mixture flows into contact with said solid adsorbent.

4. A method according to claim 1, said tracer-labeled compound being a radioactive labeled compound.

5. A method according to claim 4, said binding compound being a macromolecular compound and the particles of said adsorbent being coated with a macromolecule blocking agent.

6. A method according to claim 4, said adsorbent being in the form of a cake of finely divided particles of said adsorbent secured to said container.

7. A method according to claim 6, said cake of adsorbent containing a binder to increase the solids volume and to bind the particles of adsorbent together as a cake and to said container.

8. A method according to claim 4, said radioactive-labeled compound being related in chemical formulation to said component or an analogue thereof.

9. A method according to claim 8, said component being a polyiodothyronine and said radioactive-labeled compound being a polyiodothyronine at least one iodine atom of which is radioactive.

10. A method according to claim 4, in which said component measurement is achieved by carrying out said method with one or more biological fluid specimens to be tested in one or more of said containers and one or more controls in one or more other of said containers and comparing the radioactivity measurements of the specimen with the control, the mixing and incubation of the liquid mixtures and solid adsorbents in said containers being carried out simultaneously by inverting said containers simultaneously to suspend said adsorbent particles in said liquid mixtures.

11. A method according to claim 10, said control and specimen being incubated and centrifuged simultaneously in said containers under like conditions.

12. A method according to claim 11, the radioactivity of said control and specimen being measured while they are located in the containers in which they were mixed, incubated and centrifuged.

13. A method according to claim 11, the incubation conditions of said control and specimen being kept the same by retaining said containers in like positions with respect to inversion or noninversion during simultaneous incubation thereof, after which said containers are simultaneously centrifuged for the same time while retained in like positions with respect to inversion or noninversion.

14. A method according to claim 11, in which a plurality of specimens of biological fluid and one or more controls are mixed, incubated and centrifuged simultaneously in different containers and in the same way by inverting the containers in which they are contained simultaneously and retaining the containers in like inverted or noninverted positions at all times during incubation and centrifuging.

15. A container for use in testing for a component in a biological fluid, in which materials for use in said testing may be stored and shipped and in which said testing may be carried out, said container comprising at least two parts, in one of which a measured amount of a liquid containing a tracer-labeled compound is contained and in the other of which a measured amount of a solid particulate adsorbent for such tracer-labeled compound is secured, each of said parts having a closed end and an open end closed by a closure for shipment and storage, the open end of a first of such parts being removably mated over the open end of a second of said parts with the adsorbent located at the upper portion of the mated parts and the liquid located at the lower portion of the mated parts, whereby communication is provided between the interior of the parts so that upon inversion of the mated parts said liquid flows into contact with said solid adsorbent.

16. A container according to claim 15, in which said particulate adsorbent is in the form of a cake of finely divided adsorbent particles bonded to an inner wall of said other part.

17. A container according to claim 16, said particulate adsorbent comprising protein coated charcoal particles.

18. A container for testing for a component of a biological fluid, in which materials for use in said testing may be stored and shipped and in which said testing may be carried out, said container comprising at least two parts each of which has a closed end and an open end and in one of which a measured amount of a liquid containing a tracer-labeled compound is contained and in the other of which a measured amount of a particulate solid adsorbent for such tracer-labeled compound is secured, the open end of a first of said parts removably secured over the closed end of a second of said parts with the open end of said second part being closed by a removable closure, whereby the assembly of said container parts containing said liquid and said solid adsorbent may be shipped and stored, said open end of said first part also being removable from said closed end of said second part and removably matable over the open end of said second part with the adsorbent located at the upper portion of the mated parts and the liquid located in the lower portion, whereby communication is provided between the interior of the parts so that upon inversion of the mated parts said liquid flows into contact with said adsorbent.

19. A container according to claim 18, said tracer compound comprising a radioactive-labeled compound.

20. A container according to claim 18, made of a transparent or translucent relatively rigid resin.

21. A container according to claim 18, said liquid being contained in said second part, said removable closure forming a liquidtight seal with the open end of said second part, said mated open ends of said parts forming a liquidtight seal.

22. A block having a plurality of wells therein receiving a plurality of containers according to claim 18, with the open ends thereof mated so that the adsorbent is located at the upper portions of said containers and the liquid is located in the lower portions thereof, whereby all of said containers may be simultaneously inverted by inverting said block with said containers therein.

23. A container according to claim 18, said solid adsorbent being in the form of a cake of fine particles of said adsorbent bonded to said other part of said container.

24. A container according to claim 23, said adsorbent containing a water-soluble binding compound adapted to bind said particles together and to said other part of said container.

25. A container according to claim 18, said adsorbent being secured at the closed end of said other part.

26. A container according to claim 25, the internal wall of said other part where said adsorbent is located being corrugated to aid in securing said adsorbent against being dislodged.

27. A container according to claim 18, said container being in the form of a cylindrical vial made up of two vial parts constituting said first and second parts, the open end of said first part being adapted to be sealably mated alternatively over the closed end and the open end of the second part.

28. A container according to claim 27, the closed end portions of said vial parts having a plurality of external circumferential ribs.